(12) United States Patent
Kim et al.

(10) Patent No.: US 11,216,180 B2
(45) Date of Patent: Jan. 4, 2022

(54) REAR SEAT ENTERTAINMENT SYSTEM, REAR SEAT ENTERTAINMENT REMOTE CONTROLLER, AND METHOD THEREOF

(71) Applicants: HYUNDAI MOTOR COMPANY, Seoul (KR); KIA MOTORS CORPORATION, Seoul (KR)

(72) Inventors: Gyun Ha Kim, Incheon (KR); Eung Hwan Kim, Seoul (KR); Sang Kyung Seo, Seoul (KR); Dae Yun An, Gyeonggi-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/035,096

(22) Filed: Sep. 28, 2020

(65) Prior Publication Data
US 2021/0141526 A1 May 13, 2021

(30) Foreign Application Priority Data
Nov. 12, 2019 (KR) .................. 10-2019-0144604

(51) Int. Cl.
*G06F 3/0488* (2013.01)
*G06F 3/01* (2006.01)
*G08C 17/02* (2006.01)
*G06F 3/042* (2006.01)
*G06F 3/041* (2006.01)
*G06K 9/00* (2006.01)

(52) U.S. Cl.
CPC .......... *G06F 3/04883* (2013.01); *G06F 3/015* (2013.01); *G06F 3/041* (2013.01); *G06F 3/042* (2013.01); *G08C 17/02* (2013.01); *G06F 2203/04106* (2013.01); *G06K 9/00892* (2013.01); *G08C 2201/32* (2013.01)

(58) Field of Classification Search
CPC ...... G06F 3/04883; G06F 3/015; G06F 3/041; G06F 3/042; G06F 2203/04106; G08C 17/02; G06K 9/00892
See application file for complete search history.

(56) References Cited

U.S. PATENT DOCUMENTS

| | | | | |
|---|---|---|---|---|
| 2016/0169685 A1* | 6/2016 | Heo | ........................ | H04W 4/40 701/2 |
| 2017/0011210 A1* | 1/2017 | Cheong | .................... | H04W 4/00 |
| 2018/0159593 A1* | 6/2018 | Bogdan | ............... | H04L 12/1895 |
| 2020/0037904 A1* | 2/2020 | Tegen | ..................... | A61B 5/746 |

* cited by examiner

*Primary Examiner* — Robert J Michaud
(74) *Attorney, Agent, or Firm* — Morgan, Lewis & Bockius LLP

(57) ABSTRACT

A rear seat entertainment (RSE) remote controller and a method thereof are provided. The RSE remote controller includes a sensing module provided with a sensing surface including a biometric sensor and configured to sense a biometric signal and a finger gesture of a user, a main processor configured to provide an AC current to the sensing module, and a short-range wireless communication module configured to transmit one of the sensed biometric signal or the sensed finger gesture to a rear seat monitor through wireless communication depending on an operation mode.

17 Claims, 10 Drawing Sheets

REAR SEAT ENTERTAINMENT SYSTEM, REAR SEAT ENTERTAINMENT REMOTE CONTROLLER, AND METHOD THEREOF

CROSS-REFERENCE TO RELATED APPLICATION

This application claims priority to and the benefit of Korean Patent Application No. 10-2019-0144604, filed on Nov. 12, 2019, the entire contents of which are incorporated herein by reference.

TECHNICAL FIELD

The present disclosure relates to rear seat entertainment (RSE) of a vehicle, and more particularly, relates to technologies of performing RSE remote control using a biometric sensor.

BACKGROUND

The statements in this section merely provide background information related to the present disclosure and may not constitute prior art.

Recently, with the combination of vehicles and IT technology, smartification of vehicles has been increased rapidly.

Recently, there has been an interest in RSE, which is a system for providing various entertainment functions such as music and movie appreciation and games for rear seat passengers, as an operation of the vehicle.

A conventional RSE system has an inconvenience where a rear seat passenger should move his or her upper body forward to operate a touch screen disposed on a rear surface of the backrest of the front seat.

SUMMARY

An aspect of the present disclosure provides a rear seat entertainment (RSE) system, an RSE remote controller, and a method thereof.

Another aspect of the present disclosure provides an RSE remote controller for providing a healthcare function using a biometric sensor and a method thereof.

Another aspect of the present disclosure provides an RSE remote controller for performing RSE remote control using a biometric sensor without a touch operation of a rear seat monitor and a method thereof.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a rear seat entertainment remote controller may include a sensing module that is provided with a sensing surface including a biometric sensor and senses a biometric signal and a finger gesture of a user, a main processor that supplies AC current to the sensing module, and a short-range wireless communication module that transmits one of the sensed biometric signal or the sensed finger gesture to a rear seat monitor through short-range wireless communication depending on an operation mode.

As an embodiment, the biometric sensor may include an electrocardiogram (ECG) sensor and a photoplethysmogram (PPG) sensor.

As an embodiment, the sensing surface may include a first sensing surface and a second sensing surface.

As an embodiment, the first sensing surface may include the ECG sensor. The second sensing surface may include the ECG sensor and the PPG sensor.

As an embodiment, the ECG sensor may include a plurality of divided electrodes. The sensing module may sense the finger gesture based on a change in impedance on the plurality of divided electrodes.

As an embodiment, the sensing module may identify a swipe gesture based on an order where electrodes, each of which has the change in impedance greater than a reference value, are detected.

As an embodiment, the sensing module may sense a touch gesture on the second sensing surface based on an optical signal detected by the PPG sensor.

As an embodiment, the main processor may sample the biometric signal received from the sensing module and may transmit the sampled biometric signal to the rear seat monitor, when a current loop is formed through the sensing module.

As an embodiment, the current loop may be famed in a state where one of left fingers is in contact with a first sensing surface and where one of right fingers is in contact with a second sensing surface.

As an embodiment, the rear seat monitor may display healthcare information depending on the transmitted biometric signal.

As an embodiment, the healthcare information may include at least one of heart rate information, heart rate variability (HRV) information, stress analysis information, blood pressure information, blood flow information, heart age information, or emotional state information.

As an embodiment, a screen of the rear seat monitor may be controlled based on the sensed user gesture.

As an embodiment, the RSE remote controller may further include a battery that supplies AC power and a display that displays a state of the battery and a connection state of the short-range wireless communication. The short-range wireless communication module may perform Bluetooth communication.

According to another aspect of the present disclosure, a rear seat entertainment system may include a rear seat monitor, an RSE remote controller that includes a sensing module that is provided with a sensing surface including a biometric sensor and senses a biometric signal and a finger gesture of a user, a main processor that supplies AC current to the sensing module, and a short-range wireless communication module that transmits information about the sensed biometric signal or the sensed finger gesture to a rear seat monitor through short-range wireless communication depending on an operation mode, and an RSE provider that provides the rear seat monitor with healthcare information corresponding to the biometric signal based on information received from the rear seat monitor or controls a screen of the rear seat monitor depending on the finger gesture.

As an embodiment, the finger gesture may be a gesture using at least one finger of one hand.

According to another aspect of the present disclosure, a rear seat entertainment remote control method may include setting an operation mode depending on selection of a user, sensing a biometric signal or a finger gesture of the user using a biometric sensor provided in a sensing surface depending on the set operation mode, and transmitting the sensed biometric signal or the sensed finger gesture to a rear seat monitor through short-range wireless communication.

As an embodiment, the biometric sensor may include an ECG sensor and a PPG sensor. The sensing surface may include a first sensing surface and a second sensing. The first sensing surface may include the ECG sensor and the second sensing device may include the ECG sensor and the PPG sensor.

As an embodiment, the ECG sensor may include a plurality of divided electrodes and senses a swipe gesture on the sensing surface based on a change in impedance on the plurality of divided electrodes. The PPG sensor may detect an optical signal and senses a touch gesture on the second sensing surface based on the detected optical signal.

As an embodiment, the RSE remote control method may further include supplying AC current to the sensing module and determining whether a current loop is formed through the biometric sensor. The current loop may be formed in a state where one of left fingers is in contact with the first sensing surface and where one of right fingers is in contact with the second sensing surface. The operation mode may be set to a measurement mode to transmit the sensed biometric signal to the rear seat monitor, when the current loop is formed.

As an embodiment, healthcare information may be displayed on the rear seat monitor according to the transmitted biometric signal. A screen of the rear seat monitor may be controlled based on the sensed user gesture.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
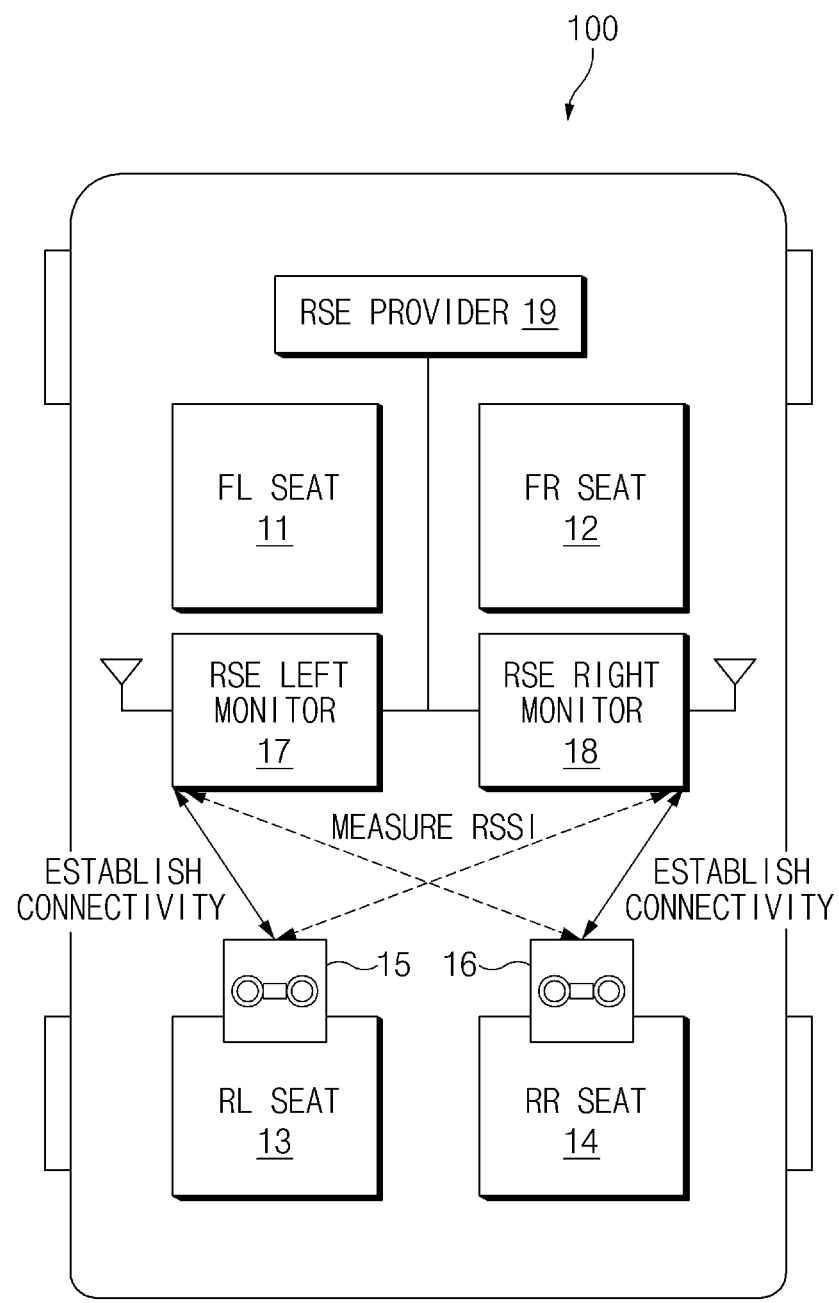
FIG. 1 is a drawing illustrating a rear seat entertainment (RSE) system in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such tams as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

FIG. 1 is a drawing illustrating a rear seat entertainment (RSE) system according to an embodiment of the present disclosure.

As shown in FIG. 1, four seats—that is, a front left (FL) seat 11, a front right (FR) seat 12, a rear left (RL) seat 13, and a rear right (RR) seat 14—may be provided in a vehicle 100. An RSE left monitor 17 and an RSE right monitor 18 for providing an RSE personalization service may be installed to be respectively opposite to the RL seat 13 and the RR seat 14.

An RSE provider 19 may perform short-range wireless communication with RSE remote controllers 15 and 16 through antennas respectively provided in the RSE left monitor 17 and the RSE right monitor 18. As an example, the short-range wireless communication may be, but is not limited to, one of Bluetooth communication, wireless-fidelity (Wi-Fi) communication, radio frequency identification (RFID) communication, or ultrawideband (UWB) communication.

The RSE provider 19 may measure intensity of a signal—for example, a received signal strength indicator (RSSI)—received from each of the RSE remote controllers 15 and 16 and may identify a location of a passenger—that is, a location of each of the RSE remote controllers 15 and 16—, thus establishing RSE personalization connectivity. In other words, when the RSE remote controller 15 is located on the RL seat 13, the RSE personalization connectivity may be automatically established with the RSE left monitor 17. When the RSE remote controller 16 is located on the RR seat 14, the RSE personalization connectivity may be automatically established with the RSE right monitor 18.

The embodiment of FIG. 1 is exemplified as the RSE provider 19 performs short-range wireless communication with the RSE remote controllers 15 and 16 through the RSE monitor, but it is merely one embodiment. In another embodiment, the RSE provider 19 is wiredly connected with the RSE remote controllers 15 and 16. Hereinafter, a description will be given of an example where the RSE provider 19 and the RSE remote controllers 15 and 16 perform Bluetooth communication via an antenna provided in the RSE monitor.

Figure 2:
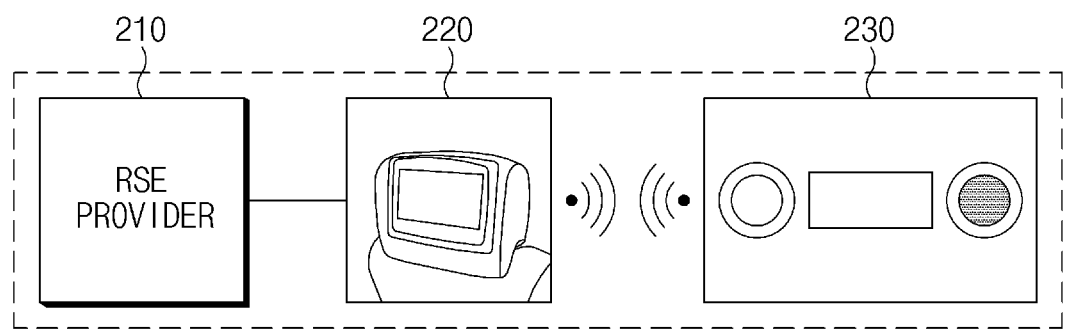
FIG. 2 is a drawing illustrating RSE remote control in one form of the present disclosure.

FIG. 2 is a drawing illustrating RSE remote control according to an embodiment of the present disclosure.

Referring to FIG. 2, an RSE remote controller 230 may perform short-range wireless communication with a rear seat monitor 220, and the rear seat monitor 220 may be wiredly connected with an RSE provider 210.

As an example, the RSE remote controller 230 may perform Bluetooth communication with the rear seat monitor 220, and the rear seat monitor 220 may be connected with the RSE provider 210 through in-vehicle communication.

Herein, the in-vehicle communication may include, but is not limited to, controller area network (CAN) communication, Ethernet communication, local interconnect network (LIN) communication, or the like.

As another embodiment, the rear seat monitor 220 and the RSE provider 210 may perform wireless local area network (WLAN) communication or may be connected by a direct line.

The RSE provider 210 may exchange information with a vehicle audio video navigation telematics (AVNT) device (or a head unit or a cluster) and other vehicle controllers through in-vehicle communication.

As an example, the RSE provider 210 may obtain image and sound source information, digital multimedia broadcasting (DMB) information, driving information, map information, weather information, point of interest (POI) information, or the like from AUNT depending on a control signal received from the RSE remote controller 230 and may output the obtained information to the rear seat monitor 220.

The RSE remote controller 230 according to an embodiment may be provided with various biometric sensors. The RSE remote controller 230 may transmit biometric sensing information to the RSE provider 210 via the rear seat monitor 220.

As an example, the biometric sensor may include a photoplethysmogram sensor—hereinafter, referred to as 'PPG sensor'- and an electrocardiogram sensor—hereinafter referred to as 'ECG sensor'—.

The PPG sensor may configured to include an embedded LCD (or LED) for outputting a green light to a photodetector, a photodiode (PD) for detecting the green light which is absorbed into some skin and is then reflected, and a signal converter for converting the optical signal detected by the PD into an electrical signal.

The ECG sensor may measure a very small current using three small electrodes and may be designed to more accurately measure current on dry skin through a low-impedance contact point.

As an example, a high dynamic range (HDR) LED driver of the capacity of 100 mA may be applied to the ECG sensor. Furthermore, a noise filter for controlling noise components generated by other muscle movement except for heartbeat may be applied to the ECG sensor.

The RSE provider 210 may generate healthcare information based on the received biometric sensing information and may output the generated healthcare information to the rear seat monitor 220.

Herein, the healthcare information may include heart rate information, heart rate variability (HRV) information showing a change in time interval between heartbeats, stress analysis information, blood pressure information, heart age information, emotional state information, or the like.

The RSE remote controller 230 may simultaneously sample biometric sensing information received from the PCG sensor and the ECG sensor and, as a result, may provide a pulse transit time (PTT) and a pulse wave velocity (PWV), each of which has maximum sensitivity.

As another embodiment, the RSE remote controller 230 may be additionally equipped with a temperature sensor, a blood sugar sensor, a saturation of peripheral oxygen (SpO2) sensor, or the like. In this case, the RSE provider 210 may interwork with the RSE remote controller 230 to provide healthcare information such as body temperature information, blood sugar information, or SpO2 information to a passenger via the rear seat monitor 220.

Furthermore, the RSE remote controller 230 may detect a remote control signal depending on a gesture of the user and may provide the detected remote control signal to the RSE provider 210 via the rear seat monitor 220.

The RSE provider 210 may control an output screen of the rear seat monitor 220 depending on the received remote control signal.

As an example, a rear seat passenger may perform a control operation of the rear seat monitor 220, for example, he or she may move a screen displayed on the rear seat monitor 220 up/down/left/right using the RSE remote controller 230, may move a pointer displayed on the screen to a specific location, may output a screen corresponding to an area where the pointer is displayed, or may move the pointer to a specific screen once.

The RSE remote controller 230 may be provided with a display—for example, a small LCD—to display a battery state, a communication connection state, and the like.

Figure 3:
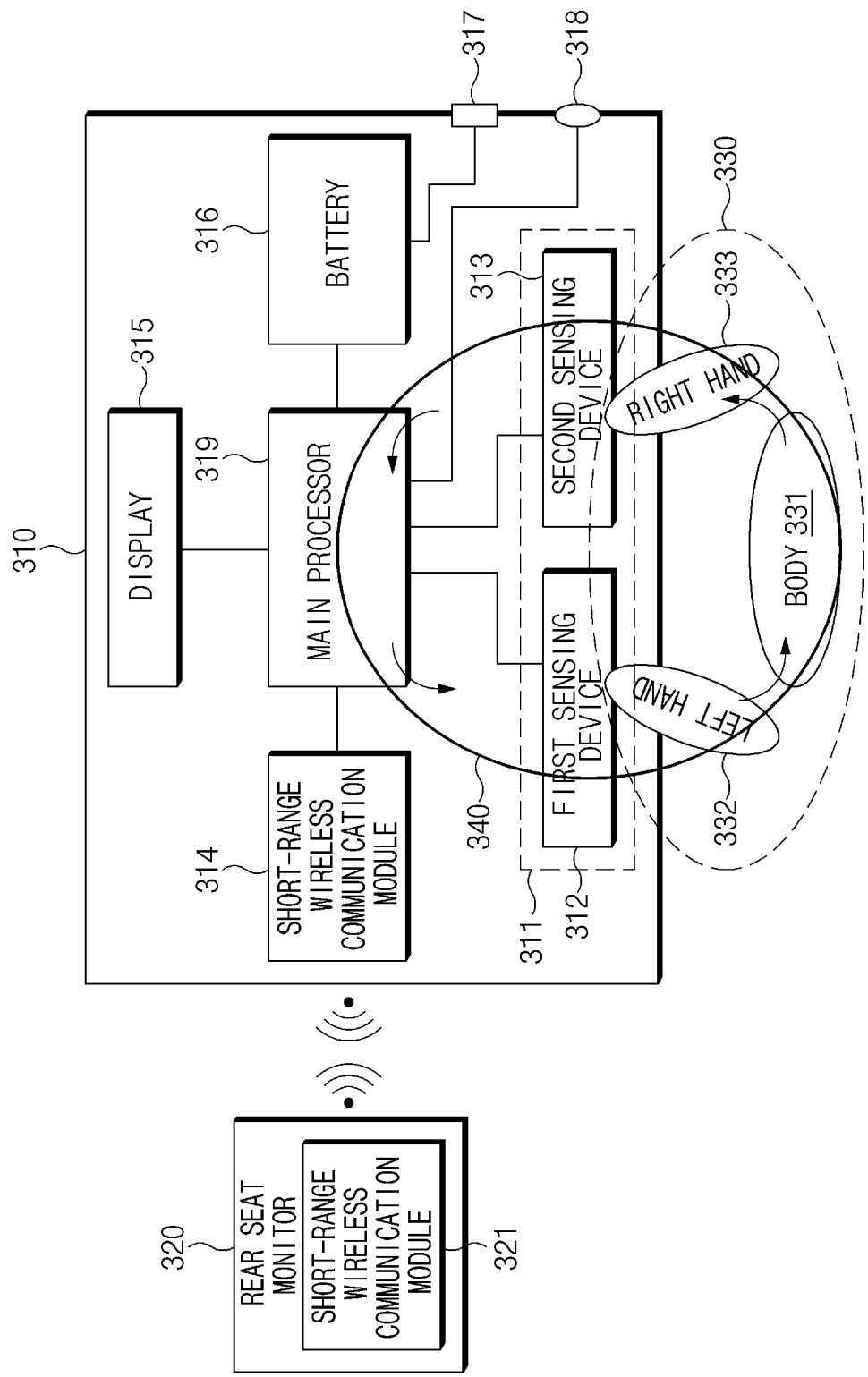
FIG. 3 is a block diagram illustrating a detailed configuration of an RSE remote controller in one form of the present disclosure.

FIG. 3 is a block diagram illustrating a detailed configuration of an vehicle remote controller according to an embodiment of the present disclosure.

Referring to FIG. 3, a vehicle remote controller 310 may be configured to include a sensing module 311, a short-range wireless communication module 314, a display 315, a battery 316, a power terminal 317, an earphone jack 318, and a main processor 319.

The sensing module 311 may include a first sensing device 312 and a second sensing device 313.

The vehicle remote controller 310 and a rear seat monitor 320 may exchange information via short-range wireless communication modules 314 and 321 respectively provided therein. As an example, each of the short-range wireless communication module 321 and 314 may be loaded with a Bluetooth communication function.

The main processor 319 may monitor a connection state of the short-range wireless communication module 314 and a charging state of a battery 316 and may display the monitored result on the display 315.

The vehicle remote controller 310 may change an operation mode depending on selection of a user. Herein, the operation mode may include a measurement mode and a manipulation mode.

The vehicle remote controller 310 may sample a biometric signal of the user, which is received via the sensing module 311 provided therein, in the measurement mode to generate biometric information.

The vehicle remote controller 310 may transmit the generated biometric information to an RSE provider 210 via the rear seat monitor 320 connected through short-range wireless communication.

As an example, the biometric information may include, but is not limited to, heartbeat information, blood pressure information, blood flow rate information, SpO2 information, stress information, heart rate information, or the like.

As an embodiment, the first sensing device 312 may include an ECG sensor, and the second sensing device 313 may include an ECG sensor and a PPG sensor.

As another embodiment, the first sensing device 312 may include an ECG sensor and a PPG sensor, and the second sensing device 313 may include an ECG sensor.

A passenger who rides in the rear seat of the vehicle may put one of his or her left fingers on a sensing surface of the first sensing device 312 and may put one of his or her right fingers on a sensing surface of the second sensing device 313 to identify healthcare information on the rear seat monitor 320.

The main processor 319 may generate AC current of a certain frequency using a power of the battery 316 and may supply the AC current to the sensing module 311.

When both hands of the user are in contact with electrodes provided in the sensing surfaces of the first sensing device 312 and the second sensing device 313, as shown in reference numeral 340, an electrical loop may be formed through a body of the user. The main processor 319 may monitor current which flows through the formed loop and may determine that both the hands of the user are in contact with the electrodes provided in the sensing surfaces of the first sensing device 312 and the second sensing device 313.

When it is determined that both the hands of the user are in contact with the electrodes, the main processor 319 may enter the measurement mode to generate sensing information.

When a condition where the main processor 319 enters the measurement mode is not established, the vehicle remote controller 310 may operate in the manipulation mode.

In the manipulation mode, the vehicle remote controller 310 may control a screen of the rear seat monitor 320 depending on a gesture of the user, which is detected by the sensing module 311.

The method for controlling the screen of the rear seat monitor 320 depending on the gesture of the user may become clearer through a description of drawings, which will be described below.

Figure 4:
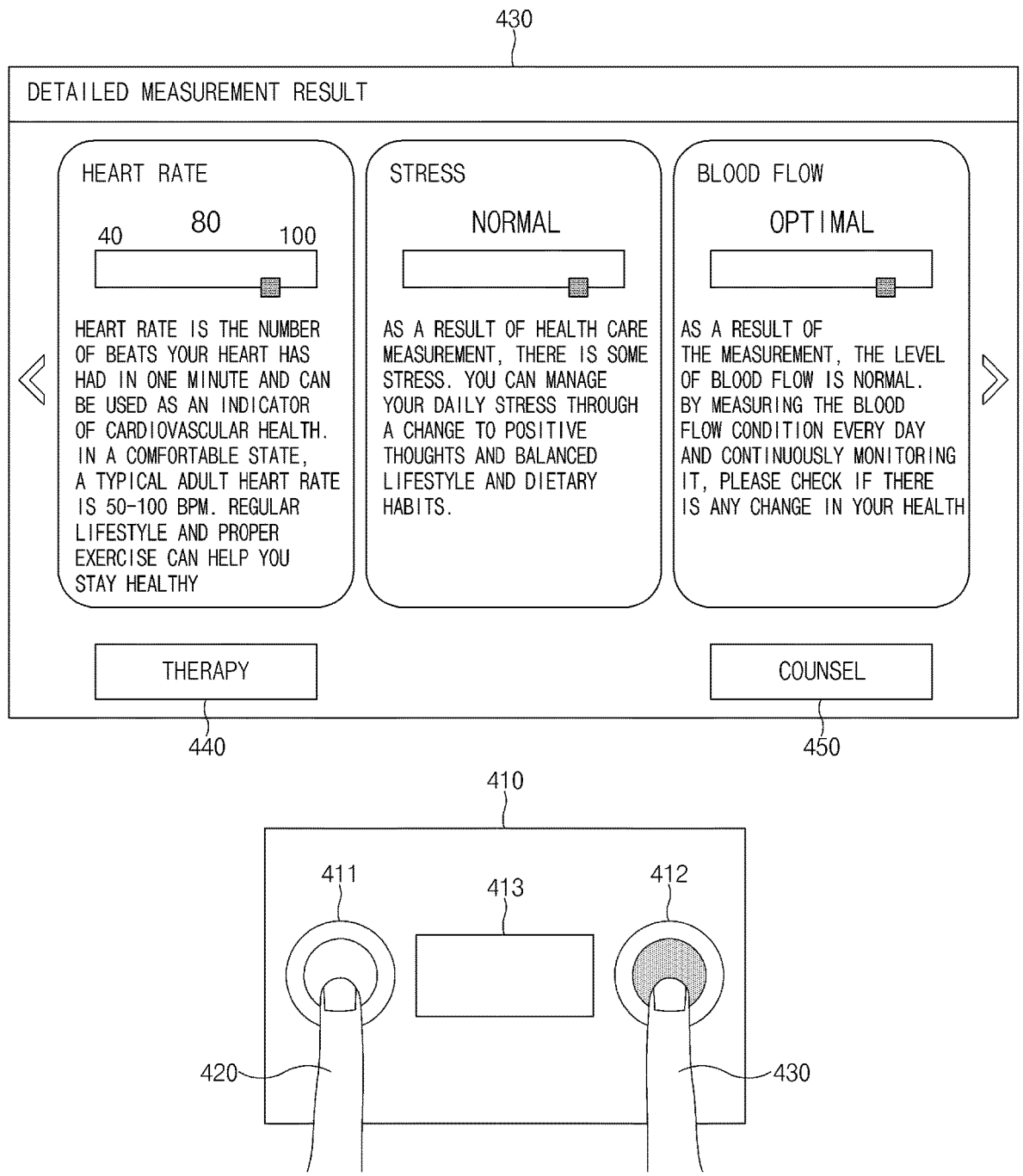
FIG. 4 is a drawing illustrating a method for providing a healthcare service using an RSE remote controller in one form of the present disclosure.

FIG. 4 is a drawing illustrating a method for providing a healthcare service using an RSE remote controller according to an embodiment of the present disclosure.

Referring to FIG. 4, when a user maintains a state, where his or her left finger 420 is in contact with a first sensing surface 411 of an RSE remote controller 410 and where his or her right finger 430 is in contact with a second sensing surface 412 of the RSE remote controller 410, during a certain time, a detailed measurement result associated with healthcare may be displayed on a rear seat monitor 440.

The user may check desired healthcare information through a specific finger gesture on the first sensing surface 411 and/or the second sensing surface 412 of the RSE remote controller 410.

Furthermore, the user may select a therapy button 440 to obtain detailed therapy information corresponding to the selected healthcare information.

Furthermore, the user may select a counsel button 450 to perform online chat counseling or telephone counseling with a specialist counselor—for example, including a doctor, a doctor of Korean medicine, or the like—with respect to the detailed measurement result, or may book a consultation.

Figure 5:
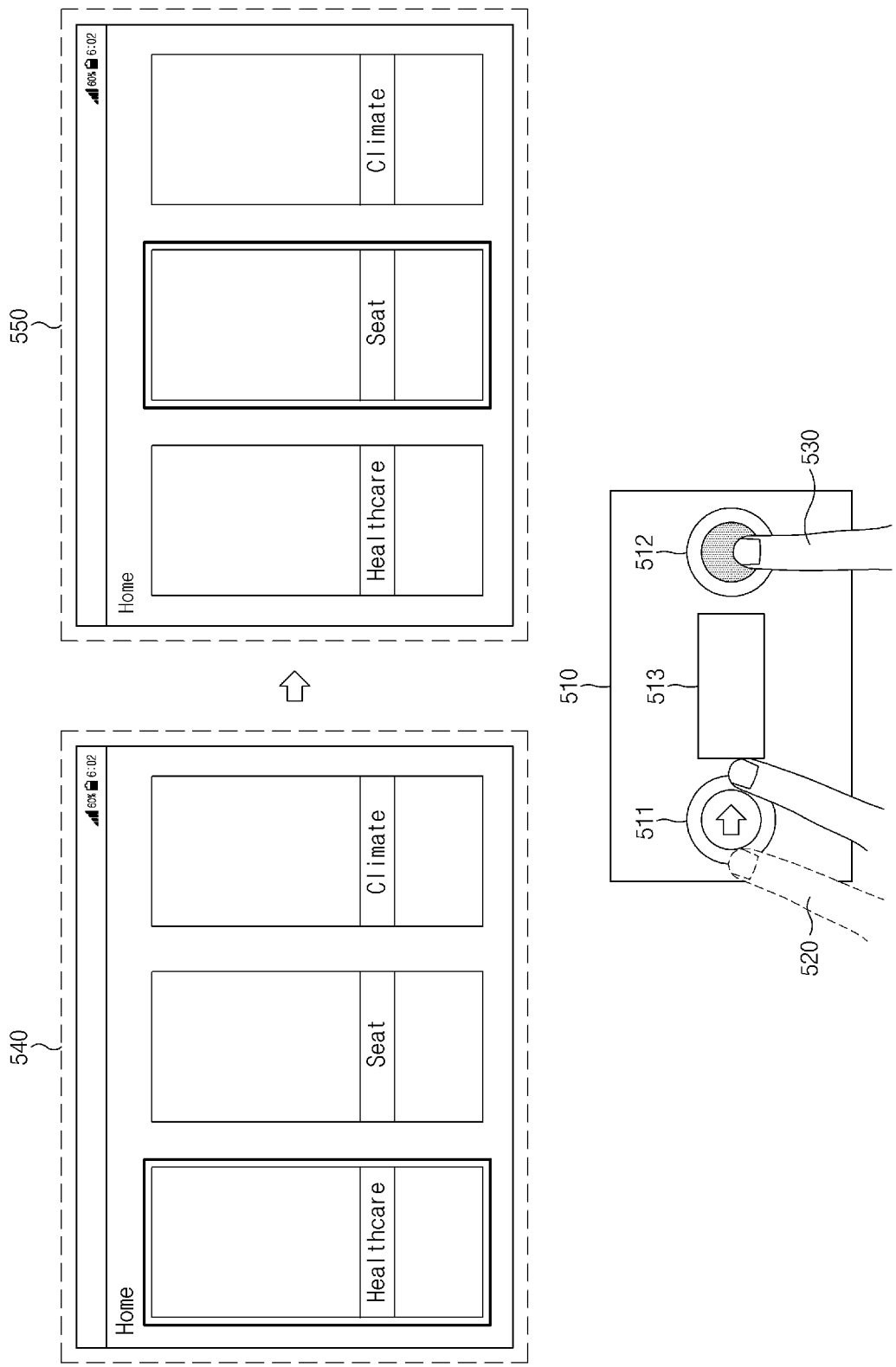
FIG. 5 is a drawing illustrating a method for moving a section region using an RSE remote controller in one form of the present disclosure.

FIG. 5 is a drawing illustrating a method for moving a section region using an RSE remote controller according to an embodiment of the present disclosure.

Referring to FIG. 5, as shown in reference numeral 540, in a state where a healthcare menu is enabled on a home screen, a user may enable a seat menu which is just to the right of the healthcare menu, as shown in reference numeral 550, through a gesture swiping a first finger 520 from the left to the right on a first sensing surface 511. Of course, the user may move the enabled menu to a menu which is just to the right of the enabled menu through a gesture swiping the first finger 520 in a horizontal direction from the right to the left on a first sensing surface 511.

As an example, while the first finger 520 of the user makes a swipe gesture in a horizontal direction for selection menu movement, a second finger 530 of the user may maintain a state where it is in contact with a second sensing surface 512.

As another example, while the first finger 520 of the user makes a swipe gesture in a horizontal direction for selection menu movement, the second finger 530 may maintain a state where it is out of contact with the second sensing surface 512.

The embodiment of FIG. 5 is exemplified as the user makes a finger swipe gesture in the horizontal direction on the first sensing surface 511 for selection menu movement, but it is merely one embodiment. Another embodiment may be implemented such that the user makes a swipe gesture in a horizontal direction on the second sensing surface 512 for selection menu movement.

According to an embodiment, the user may adjust a screen of a rear seat monitor using only one hand in a manipulation mode. In other words, both the first finger 520 and the second finger 530 described with reference to FIG. 5 and both of a first finger and a second finger which will be described with reference to the following drawings may be left fingers or right fingers.

According to another embodiment, the user may adjust a screen of a rear seat monitor using both hands in the manipulation mode. In this case, the first finger 520 described with reference to FIG. 5 may be a left finger, and the second finger 530 described with reference to FIG. 5 may be a right finger.

Figure 6:
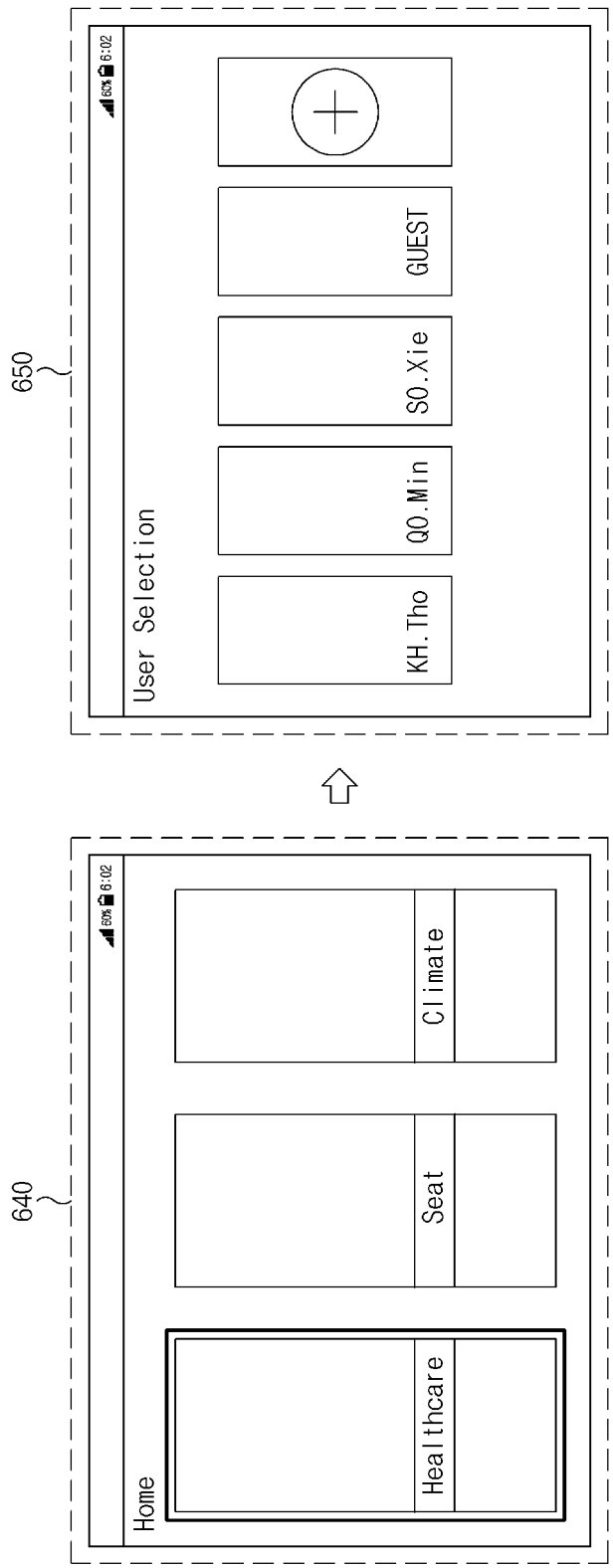
FIG. 6 is a drawing illustrating a method for moving a screen using an RSE remote controller in one form of the present disclosure.
Figure 6:
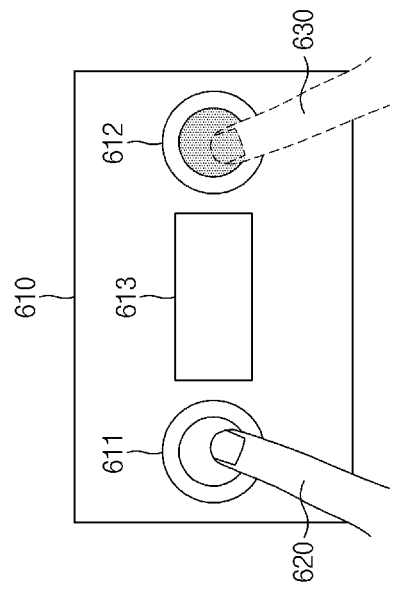

FIG. 6 is a drawing illustrating a method for moving a screen according to an embodiment of the present disclosure.

Referring to FIG. 6, as shown in reference numeral 640, in a state where a healthcare menu is enabled on a home screen, a user may move the home screen to a next screen corresponding to the currently enabled healthcare menu—for example, a user selection screen—, as shown in reference numeral 650, through a gesture touching a second sensing surface 612 one time using a second finger 630.

As an example, while the second finger 630 of the user makes a touch gesture one time for next screen movement, a first finger 620 may maintain a state where it is in contact with a first sensing surface 611.

The second sensing surface 612 of an RSE remote controller 610 may be provided with a PPG sensor as well as an ECG sensor to detect a finger touch operation of the user.

As an example, the second sensing surface 612 may be a circle, and an LCD panel which is a photodetector of the PPG sensor may be disposed at an inner side of a circular ECG sensor electrode.

Figure 7:
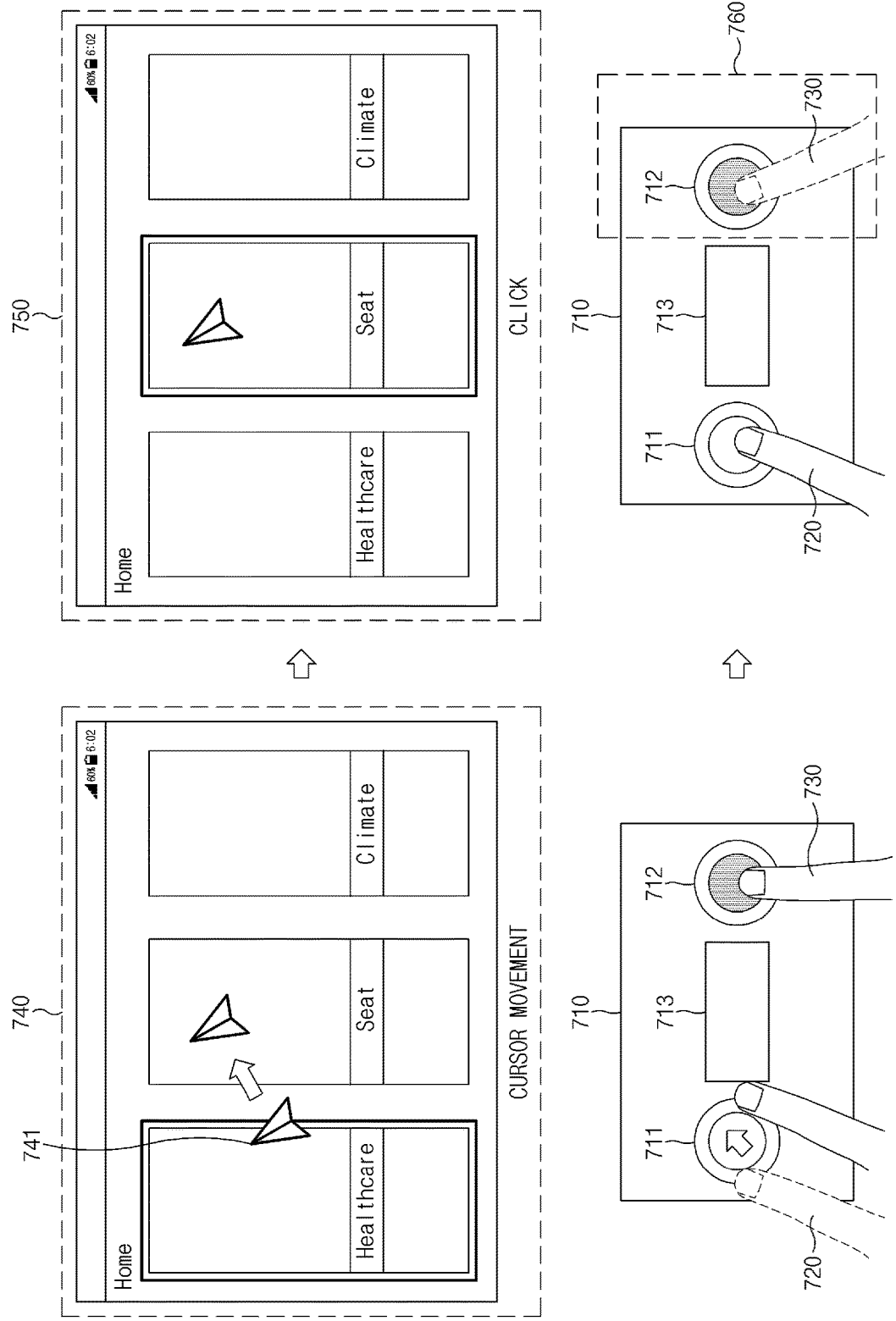
FIG. 7 is a drawing illustrating a method for moving a selection region and a screen using an RSE remote controller in one form of the present disclosure.

FIG. 7 is a drawing illustrating a method for moving a selection region and a screen using an RSE remote controller according to an embodiment of the present disclosure.

Referring to FIG. 7, as shown in reference numeral 740, a cursor 741 may be displayed on a screen of a rear seat monitor. In a state where a healthcare menu is enabled, a user may move the cursor 741 through a gesture swiping a first finger 720 in a diagonal direction from the left to the right on a first sensing surface 711 to enable a seat menu which is just to the right of the healthcare menu, as shown in reference numeral 750.

The user may enable a menu which is just to the left of the currently enabled menu, through a gesture swiping the first finger 720 in a diagonal direction from the right to the left on the first sensing surface 711.

As an example, while the first finger 720 of the user makes a swipe gesture in a diagonal direction for selection menu movement, a second finger 730 of the user may maintain a state where it is in contact with a second sensing surface 712.

As another example, while the first finger 720 of the user makes a swipe gesture in a diagonal direction for selection menu movement, the second finger 730 may maintain a state where it is out of contact with the second sensing surface 712.

The embodiment of FIG. 7 is exemplified as the user makes a swipe gesture with the first finger 720 in the diagonal direction for selection menu movement, but it is merely one embodiment. Another embodiment may be implemented such that the user makes a swipe gesture with the second finger 730 in a diagonal direction for selection menu movement.

Figure 8:
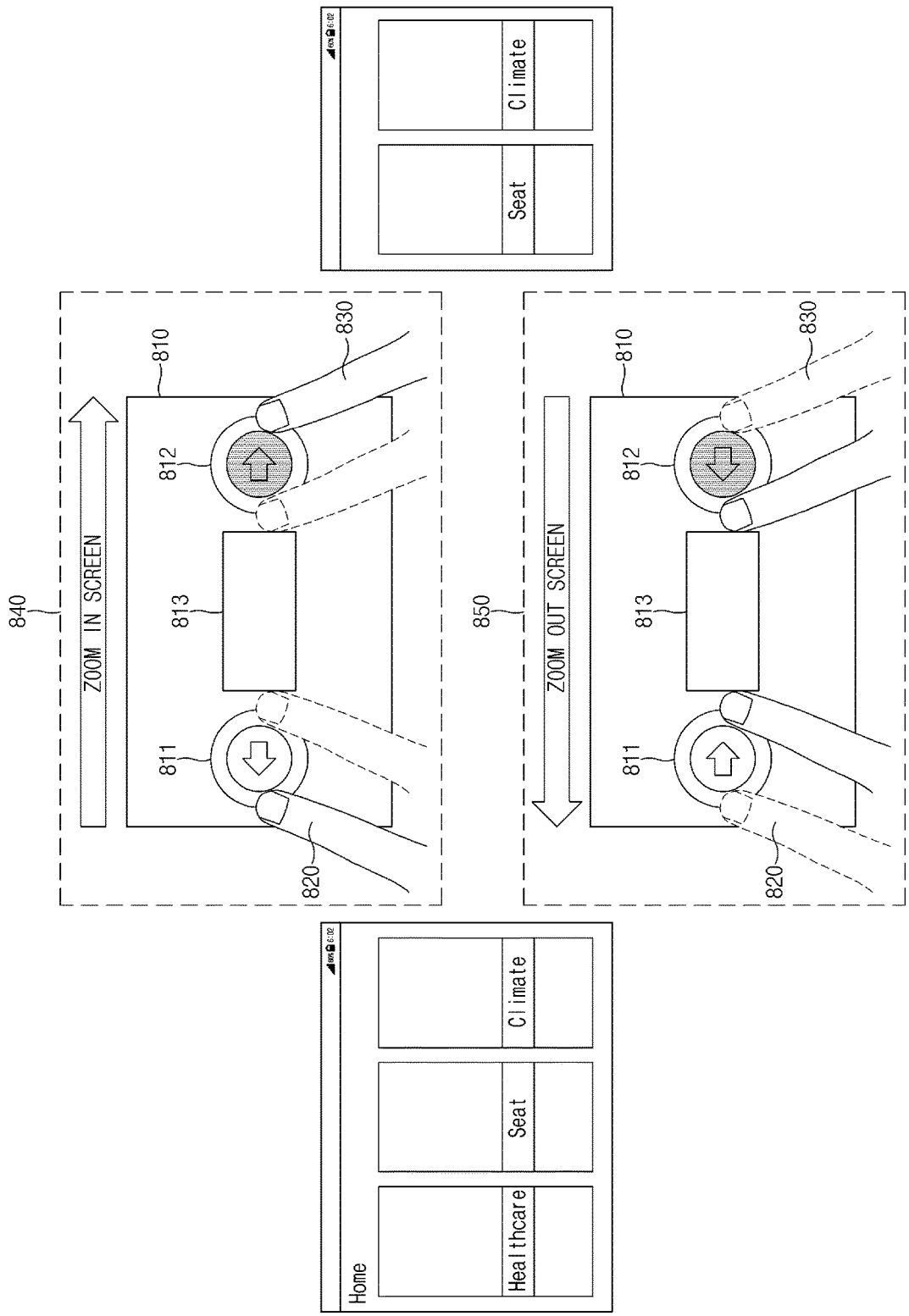
FIG. 8 is a drawing illustrating a method for zooming in/out a screen using an RSE remote controller in one form of the present disclosure.

FIG. 8 is a drawing illustrating a method for zooming in/out a screen using an RSE remote controller according to an embodiment of the present disclosure.

Referring to FIG. 8, as shown in reference numeral 840, a user may make a swipe gesture using a first finger 820 in a horizontal direction from the right to the left on a first sensing surface 811 of an RSE remote controller 810 and may simultaneously make a swipe gesture using a second finger 830 in a horizontal direction from the left to the right on a second sensing surface 812 of the RSE remote controller 810, thus zooming in a screen of a rear seat monitor.

Furthermore, as shown in reference numeral 850, the user may make a swipe gesture using the first finger 820 in a horizontal direction from the left to the right on the first sensing surface 811 of the RSE remote controller 810 and may simultaneously make a swipe gesture using the second finger 830 in a horizontal direction from the right to the left on the second sensing surface 812 of the RSE remote controller 810, thus zooming out the screen of the rear seat monitor.

Figure 9:
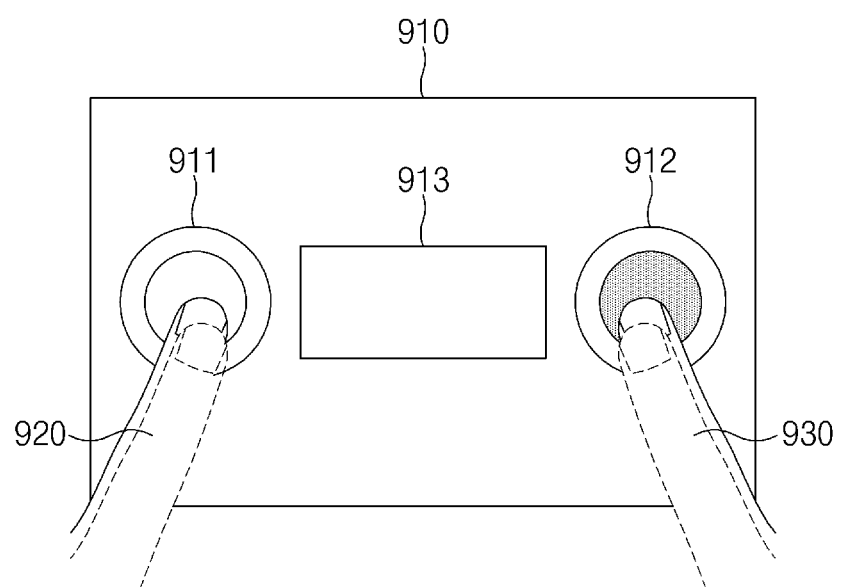
FIG. 9 is a drawing illustrating a favorites method using an RSE remote controller in one form of the present disclosure.

FIG. 9 is a drawing illustrating a favorites method using an RSE remote controller according to an embodiment of the present disclosure.

Referring to FIG. 9, a user may double-click on a first sensing surface 911 and a second sensing surface 912 of an RSE remote controller 910 at the same time using a first finger 920 and a second finger 930, thus moving a current menu to a predetermined favorites menu.

According to an embodiment, the user may click on the first sensing surface 911 and the second sensing surface 912 of the RSE remote controller 910 three times at the same time using the first finger 920 and the second finger 930, thus changing a mode. Herein, the mode may include a measurement mode and a manipulation mode.

Figure 10:
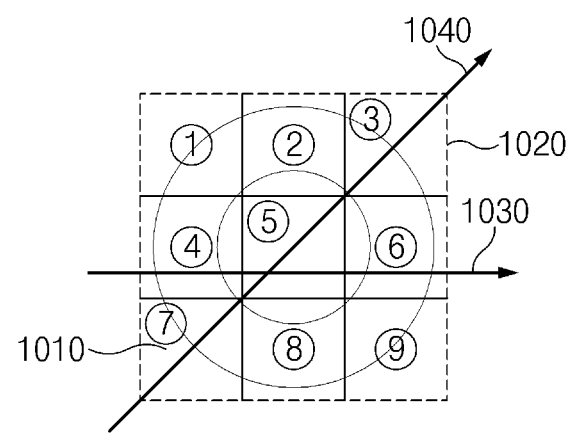
FIG. 10 is a drawing illustrating a method for implementing a sensor electrode for detecting a user gesture in one form of the present disclosure.

FIG. 10 is a drawing illustrating a method for implementing a sensor electrode for detecting a user gesture according to an embodiment of the present disclosure.

Referring to FIG. 3, AC current which flows from a main processor 319 of an RSE remote controller 310 when a finger of a user is in contact with a sensing surface provided with an electrode may flow again in the main processor 319 through a body of the user to form a current loop. The main processor 319 may measure AC current which flows through the formed current loop to detect that the user touches the electrode.

An electrode is formed on a sensing surface 1010 provided in the RSE remote controller 310, and a change in impedance according to a finger touch of the user may be detected.

Referring to FIG. 10, the sensing surface 1010 according to an embodiment may be divided into a plurality of regions. The RSE remote controller 310 may measure a change in impedance for each divided electrode region and may identify a finger gesture on a corresponding sensing surface of the user.

As an example, the sensing surface 1010 are divided into 9 regions as shown in reference numeral 1020, but it is merely one embodiment. As another example, the sensing surface 1010 may be divided into regions which are greater than or less than the 9 regions. Hereinafter, for convenience of description, the 9 regions may be referred to as first to ninth electrode regions.

As an example, when intensity of impedance on the sensing surface 1010 changes to a reference value or more in an order of the fourth electrode region, the fifth electrode region, and the sixth electrode region, as shown in reference numeral 1030, the RSE remote controller 310 may detect a swipe gesture in a horizontal direction.

As another example, when intensity of impedance on the sensing surface 1010 changes to the reference value or more in an order of the seventh electrode region, the fifth electrode region, and the third electrode region, as shown in reference numeral 1040, the RSE remote controller 310 may detect a swipe gesture in a diagonal direction.

The operations of the method or the algorithm described in connection with the embodiments disclosed herein may be embodied directly in hardware or a software module executed by the processor or in a combination thereof. The software module may reside on a storage medium and/or storage such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

An embodiment of the present disclosure may provide an RSE system, an RSE remote controller, and a method thereof.

Furthermore, an embodiment of the present disclosure may provide an RSE remote controller capable of providing a healthcare function using a biometric sensor provided therein and a method thereof.

Furthermore, an embodiment of the present disclosure may provide an RSE remote controller capable of performing RSE remote control using a biometric sensor without a touch operation of a rear seat monitor and a method thereof.

Furthermore, an embodiment of the present disclosure may provide an RSE remote controller capable of minimizing an unnecessary operation of a rear seat passenger to improve healthcare measurement accuracy and a method thereof.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A rear seat entertainment (RSE) remote controller, comprising:
   a sensing module provided with a sensing surface including a biometric sensor, the sensing module configured to sense a biometric signal and a finger gesture of a user;
   a main processor configured to supply AC current to the sensing module, via a battery component that is configured to supplies AC power; and
   a short-range wireless communication module configured to transmit one of the sensed biometric signal or the sensed finger gesture to a rear seat monitor through short-range wireless communication depending on an operation mode,
   wherein the biometric sensor includes an electrocardiogram (ECG) sensor and a photoplethysmogram (PPG) sensor,
   wherein the ECG sensor includes a plurality of divided electrodes,
   wherein the sensing module is configured to sense the finger gesture based on a change in impedance on the plurality of divided electrodes, and
   wherein the sensing module is configured to identify a swipe gesture based on an order where the plurality of divided electrodes is detected, wherein each divided electrode of the plurality of divided electrodes has the change in impedance greater than a reference value.

2. The RSE remote controller of claim 1, wherein the sensing surface includes a first sensing surface and a second sensing surface.

3. The RSE remote controller of claim 2, wherein the first sensing surface includes the ECG sensor, and
   wherein the second sensing surface includes the ECG sensor and the PPG sensor.

4. The RSE remote controller of claim 3, wherein the sensing module is configured to sense a touch gesture on the second sensing surface based on an optical signal detected by the PPG sensor.

5. The RSE remote controller of claim 1, wherein, when a current loop is formed through the sensing module, the main processor is configured to:
   sample the biometric signal received from the sensing module; and
   transmit the sampled biometric signal to the rear seat monitor.

6. The RSE remote controller of claim 5, wherein the current loop is formed based on the AC current from the battery component, in a state where one of left fingers is in contact with a first sensing surface and one of right fingers is in contact with a second sensing surface.

7. The RSE remote controller of claim 5, wherein the rear seat monitor is configured to display healthcare information depending on the transmitted biometric signal.

8. The RSE remote controller of claim 7, wherein the healthcare information includes at least one of heart rate information, heart rate variability (HRV) information, stress analysis information, blood pressure information, blood flow information, heart age information, or emotional state information.

9. The RSE remote controller of claim 1, wherein a screen of the rear seat monitor is controlled based on the sensed finger gesture of the user.

10. The RSE remote controller of claim 1, wherein the controller further comprises:
    the battery component that is configured to supply the AC power; and
    a display configured to display a state of the battery component and a connection state of the short-range wireless communication,
    wherein the short-range wireless communication module performs Bluetooth communication.

11. The RSE remote controller of claim 1, wherein the finger gesture includes a gesture using at least one finger of one hand.

12. A rear seat entertainment (RSE) system, comprising:
    a rear seat monitor;
    an RSE remote controller comprising:
      a sensing module provided with a sensing surface including a biometric sensor, the sensing module configured to sense a biometric signal and a finger gesture of a user;
      a main processor configured to supply AC current to the sensing module, via a battery component that is configured to supplies AC power; and
      a short-range wireless communication module configured to transmit information about the sensed biometric signal or the sensed finger gesture to the rear seat monitor through short-range wireless communication depending on an operation mode; and
    an RSE provider configured to:
      provide the rear seat monitor with healthcare information corresponding to the biometric signal based on information received from the rear seat monitor; and
      control a screen of the rear seat monitor corresponding to the finger gesture,
    wherein the biometric sensor includes an electrocardiogram (ECG) sensor and a photoplethysmogram (PPG) sensor,
    wherein the ECG sensor includes a plurality of divided electrodes,
    wherein the sensing module is configured to sense the finger gesture based on a change in impedance on the plurality of divided electrodes, and
    wherein the sensing module is configured to identify a swipe gesture based on an order where the plurality of divided electrodes is detected, wherein each divided electrode of the plurality of divided electrodes has the change in impedance greater than a reference value.

13. An RSE remote control method, comprising:
    setting an operation mode depending on selection of a user;
    sensing a biometric signal or a finger gesture of the user using a biometric sensor provided in a sensing surface depending on the set operation mode; and
    transmitting the sensed biometric signal or the sensed finger gesture to a rear seat monitor through short-range wireless communication,
    wherein the biometric sensor includes an electrocardiogram (ECG) sensor and a photoplethysmogram (PPG) sensor, and
    wherein the method further comprises:
      sensing, by the ECG sensor including a plurality of divided electrodes, the finger gesture based on a change in impedance on the plurality of divided electrodes; and
      sensing, by the ECG sensor including the plurality of divided electrodes, a swipe gesture on the sensing surface based on a change in impedance on the plurality of divided electrodes.

14. The RSE remote control method of claim 13, wherein the sensing surface includes a first sensing surface and a second sensing surface, and wherein the first sensing surface includes the ECG sensor and the second sensing surface includes the ECG sensor and the PPG sensor.

15. The RSE remote control method of claim 14, wherein the method comprises:

detecting, by the PPG sensor, an optical signal and sensing a touch gesture on the second sensing surface based on the detected optical signal.

16. The RSE remote control method of claim 14, wherein the method further comprises:

supplying AC current to the sensing module;

determining whether a current loop is formed through the biometric sensor;

forming the current loop based on the AC current from the battery component, when one of left fingers is in contact with the first sensing surface and one of right fingers is in contact with the second sensing surface; and when the current loop is formed, setting the operation mode to a measurement mode to transmit the sensed biometric signal to the rear seat monitor.

17. The RSE remote control method of claim 16, wherein the method further comprises:

displaying healthcare information on the rear seat monitor according to the transmitted biometric signal; and controlling a screen of the rear seat monitor based on the sensed finger gesture of the user.

\* \* \* \* \*